UNITED STATES PATENT OFFICE.

RICHARD H. GAINES, OF NEW YORK, N. Y.

WATERPROOF PORTLAND-CEMENT MORTAR AND PROCESS OF MAKING THE SAME.

No. 883,683.   Specification of Letters Patent.   Patented March 31, 1908.

Application filed October 26, 1907. Serial No. 399,386.

*To all whom it may concern:*

Be it known that I, RICHARD H. GAINES, a citizen of the United States, residing at New York, in the county and State of New York, have invented certain new and useful Improvements in Waterproof Portland-Cement Mortar and Processes of Making the Same, of which the following is a specification.

My invention relates to the production of a waterproof, Portland cement mortar, which is particularly adapted to hydraulic engineering works and various other structures requiring a waterproof concrete of maximum strength.

The object of my invention is to produce an impermeable, yet inexpensive, Portland cement mortar, when employing "clean" sand, and without the introduction of abnormal amounts of free alkalies or appreciable amounts of waterproofing, organic compounds of a bituminous, resinous, oily, fatty or albuminous nature. Such compounds act as binders or fillers and usually in a few years, at best, oxidize, become brittle and porous, break down, and thus entirely lose their effectiveness for waterproofing purposes.

It has long been known (first observed by the Rogers brothers in the last century) that when certain finely powdered minerals are treated with water, reactions take place which result in partial decomposition. Concerning this fact, investigation with the microscope has shown, that water produces a colloidal surface-condition of the particles, leading to plasticity in the wet mass and increasing the binding power on induration. The latter change is due to the surface of the particles becoming clogged with the products of hydrolytic decomposition.

By the addition of electrolytes to the water with which powdered minerals, such as feldspars, were treated, it has been found (Cushman) that an increased amount of decomposition products passed into solution. In fact the same quantity of soluble decomposition products was obtained from a finely ground feldspar by treatment with a dilute solution of ammonium chlorid, as could be extracted by electrolysis without subsequent regrinding. However, the clogging effect of insoluble aluminium silicate, which is precipitated in a colloidal form on the surface of the particles, has been found to occasion the slowing up of hydrolysis on finely ground feldspar. The effect produced by dilute solutions of salts is principally to set free the soluble products of hydrolysis, otherwise absorbed by the colloidal decomposition products, and thus expose fresh surfaces to the solvent.

A study of the phenomena in connection with the coagulation of colloids by certain solutions indicates in the case of many metallic hydrates that the coagulating power of electrolytes added to colloids is much greater with polyvalent than with monovalent ions. Also researches on contact electricity, demonstrate that infinitesimal traces of certain ions, and especially of acids (hydrogen ions) render electrically neutral matters positively charged when in neutral water, even though but one five-millionth part of acid is added. The neutral liquids themselves also become charged, thus entirely changing the equilibrium conditions. The peculiar behavior of colloids, moreover, indicates that the same are electrically charged, in many cases the particles being positive and the liquid negative. The sign of the charge, however, appears to vary both with the nature of the colloid and according to the size of the particle. Upon the neutralization of the respective charges coagulation of the colloids occurs and dissolution ensues. The charge may be static or ionic.

My experiments have led to the discovery, that cement decomposition reactions, which in general are precisely similar although more pronounced, can be augmented in the same manner, namely by replacing the mixing water with a very dilute solution, preferably a one per cent. solution, of a suitable electrolyte-some substance the free charged ions of which would bring about a rearrangement of the molecules of the bodies with which they come in contact, thus causing a complete change in the equilibrium conditions of the system.

Aluminium sulfate is peculiarly adapted for replacing the mixing water in the manner above stated, when in sufficiently dilute solution, preferably one per cent. solutions, as this salt is capable of being readily precipitated as a colloidal precipitate when neutralized with alkaline oxids, such for example as the calcium oxid normally present in cement, and also this salt, owing to its instability, possesses weak acid reactions. Moreover the greater electrical charge of the trivalent aluminium ions is particularly effective in increasing its coagulating power as compared with monovalent ions. In addition to these three properties above mentioned aluminium sulfate is particularly adapted for this purpose, both because of its ready solubility and also because of the extremely low cost of the same.

Without departing from the spirit of the invention as herein claimed, it is apparent that colloiding agents, other than aluminium sulfate, but possessing similar properties, particularly its slightly acid properties as distinguished from the powerful acid properties of strong mineral acids, its precipitation by alkaline oxids, such as calcium oxid, and its ready solubility may be used. The term sesqui-oxid-forming, as used in the claims, embraces various compounds which are useful in this connection and the expression "a colloiding agent, capable of forming an insoluble precipitate with the calcium oxid normally present in the cement, and having weak acid properties" is also used as having somewhat broader significance than the expression "a compound of a sesqui-oxid-forming metal," and yet covering compounds which are also useful for this purpose in greater or less degree.

If the complex series of changes that take place in the setting of cement, be interpreted in the light of the electrolytic dissociation theory, the conclusion is reached that the following consecutive reactions occur in the wet mass: (1) Hydrolytic dissociation, i. e. dissociation under the action of ions of water. (2) Formation of colloidal films about the particles, that act as osmotic membranes, permeable to the ions of electrolytes. (3) Absorption of the basic ions by the hydrogels (inorganic colloids) resulting in coagulation. (4) Recombination of dissociated molecules, tending to equilibrium.

In the setting of cement it is evident therefore that, the hydrolytic decomposition of cement by a suitable electrolyte indicates that the electrolyte forms, with some constituent of the system, compounds too unstable to exist under the conditions, which compounds immediately break up, leaving the ions of the electrolyte free to react with fresh portions of the system, a process repeating itself to a state of equilibrium. The presence of an electrolyte, therefore, causes a very different set of conditions from that existing in its absence— conditions that impart to the concrete the desired properties of impermeability in addition to increased strength. This result of the introduction of the electrolyte may be summarized as follows: (1) By changing the equilibrium conditions of the system. (2) By increasing the quantities of reacting substances in the mass. (The fundamental idea of the law of mass action). (3) By setting free the basic ions absorbed by the colloidal decomposition products, thus exposing increased surface to the action of the solvent. (4) By catalysis or electrical action set up in the mass by the excess of free ions, thus inducing chemical action.

The important role played by the colloidal decomposition products of cement as above described indicates that the process of setting is largely due to the coagulation of inorganic colloids, and that the slowness of the action is in consequence of the indolence with which changes are prone to take place in these bodies. Indeed the simple crystallization of calcium hydroxid or other compounds, cannot give rise to the great increase in strength.

As is well known (see *Clays:* Henry Reiss) colloidal clays, as distinguished from many common clays which are usually considered non-colloidal owing to their small content of ingredients which are capable of assuming the colloid state by the action of water alone, are of a highly plastic nature and consist of heterogeneous molecular complexes. Submicroscopically, the colloidal clays possess a micellian structure, that is to say, they possess a web-like, porous formation, one of the distinguishing characteristics of which is the peculiar relation to, and dependency on, the water with which they are brought in contact, which they exhibit. When finely divided they are capable of freely flowing through small dies or fine filter papers, which are capable of preventing the passage of finely divided non-plastic common clays containing but relatively small amounts of colloidal matter.

As a result of further experiments during these observations I have discovered that the addition of inorganic colloids ("hydrogels") such, for example, as sedimentary colloidal clay, which is capable of entering into a peculiar, hydrated, non-crystalline condition, and actuating as a negative catalyzer, serves to retard or suppress the precipitation of the scarcely soluble salts, owing to the fact that they unite easily with the said salt and tend to form molecular aggregates, without necessarily being precipitated.

The homogeneous admixture of the finely divided colloidal clay with the cement, prior to the addition of sand, enables one to not only secure uniform results but is important in that the sand is free from an occluding layer of clay and therefore necessarily capable of effectively uniting with the cement particles. In fact one of the chief objections to the use of dirty sand is the entire absence of uniformity and the decrease in ultimate strength in a large number of cases due to the insulation of the surfaces of the individual sand particles by clay or loam to which the sand is virtually inert. The colloidal clay particles when admixed with the cement particles, especially minute particles varying from one-five thousandths to one-two hundred and fifty thousandths of an inch, become homogeneously and intimately united with the cement particles and upon the addition of water, the same is readily absorbed and the particles assume a gelatinous coating gradually being converted into a coherent condition whereby the mass is rendered impervious. It is evident that this peculiar affinity of colloidal clay for water, will cause the mass to swell and entirely fill up all pores and voids in the cement mass, and since there is a limit to the amount of water absorbed by the clay, the introduction of the clay is in no way detrimental to the ultimate strength of the cement mass. In fact, entirely apart from any waterproofing properties which colloidal clay imparts to concrete, it is decidedly beneficial in all cases for increasing the tensile and compression strengths, and in this it differs from the irregular effects produced by common clays containing but little colloidal matter, as heretofore determined by previous investigators. Thus, in the setting of cement, the colloids perform a most useful function and increase the time of action, whereby a gradual evolution of heat is obtained. Since the amount of available energy in the form of heat produced in a chemical reaction is a constant, whether the reaction takes place slowly or not, it is evident that the presence of suitable colloids is one of vital importance in the hardening of cement, as by the specific interaction of colloids and electrolytes, the calcium compounds normally present in the cement are protected from rapid hydration and the consequent increase in volume, which will result from any excessive rise in temperature.

In order that others skilled in the art may make use of my invention I will now proceed to describe the exact manner by which I obtain a properly balanced mixture of colloids and electrolytes in the mortar paste, whereby, when hardened, I secure a dense, impermeable mortar of maximum strength, especially applicable for making concrete.

In order to produce a one-to-three-mortar I take one hundred pounds of "neat" ordinary Portland cement clinker, with which I intimately mix during the process of grinding fifteen to thirty pounds of sedimentary colloidal clay, such, for example, as that occurring on Long Island, New York, along the Sound, or along the east shore of the Hudson. This cement-colloidal clay mixture, when sufficiently ground to reduce the particles to standard size, for example, of sufficient fineness to permit 75% to pass through a No. 200 sieve, is mixed with from 285 to 270 pounds of clean, sharp sand, in accordance with the customary specifications, and to the mixture is then added a solution containing one pound of aluminium sulfate per hundred weight, which solution entirely replaces the usual mixing water, and the proper amount of the solution to be added is determined in exactly the same manner as is the mixing water under the present methods of hydrolysis of cement.

It is evident that the mortars thus produced will be one-to three-mortars, owing to the fact that the amount of clay introduced replaces an equal amount of sand, for example, when 15 pounds of clay are present in the cement mixture, but 285 pounds of sand are mixed therewith, and if the clay is increased to thirty pounds a corresponding reduction in the amount of sand added, namely 270 pounds is made.

The strength of the electrolyte should in no case exceed five per centum, and since greater concentrations than 1% are not further ionized, this latter concentration is preferably employed.

The waterproof Portland cement mortar produced by my process is particularly applicable for the manufacture of concrete (beton) by admixture with the customary amounts of broken stone or rubble, either with or without suitable reinforcing bars, as twisted or corrugated steel bars. Moreover, contrary to expectations, there is an entire absence of corrosion of the reinforcing bars or other iron work enveloped in concrete made according to my process. Of course the broken stone may be mixed with the sand, prior to the addition of the cement-colloidal clay compound, if desired or prior to the addition of the dilute electrolyte solution, without departing from the spirit of my invention.

I am aware that it has been proposed to add to cement mortars sufficient amounts of waterproofing organic compounds of a bituminous, resinous, oily, fatty, or albuminous nature, to impart waterproofing properties to the cement mortar thus obtained. Also that it has been attempted to produce a waterproof cement mortar by the addition of free acids and alkalies, in excess of the amount which normally occurs in ordinary Portland cement. In fact one of the chief distinctions between my cement mortar and those heretofore produced which were possessed of any appreciable waterproof qualities, lies in the absence of these very compounds and the seemingly slight variation from the standard specifications commonly used.

It is evident that without departing from the spirit of my invention as claimed that either the clay may be omitted or on the other hand the electrolyte may be omitted and the clay-cement mixture and mixing water may be used in lieu thereof. In both cases I am enabled to obtain improved results, and practical impermeability, although preferably the combination of these two waterproofing agents is employed.

Having thus described my invention, I claim:

1. The process of making waterproof Portland cement mortar, which consists in first intimately mixing in a dry condition, ordinary Portland cement and an unburnt inorganic colloid, then mixing the same with sand in the presence of a dilute solution of a soluble salt of a sesqui-oxid-forming metal, and then permitting the mass to set, substantially as described.

2. The process of making waterproof Portland cement mortar, which consists in first intimately mixing in a dry condition, ordinary Portland cement and unburnt sedimentary colloidal clay, then mixing the same with sand in the presence of a dilute solution of a soluble salt of a sesqui-oxid-forming metal, and then permitting the mass to set, substantially as described.

3. The process of making waterproof Portland cement mortar, which consists in first intimately mixing in a dry condition, ordinary Portland cement and unburnt sedimentary colloidal clay, then mixing the same with sand in the presence of a dilute solution of a soluble aluminium salt, and then permitting the mass to set, substantially as described.

4. The process of making waterproof Portland cement mortar, which consists in first intimately mixing in a dry condition, ordinary Portland cement and unburnt sedimentary colloidal clay, then mixing the same with sand in the presence of a solution containing between 1% and 3% of aluminium sulfate, and then permitting the mass to set, substantially as described.

5. A waterproof Portland cement mortar, comprising sand, hydrolized ordinary Portland cement, and colloidal unburnt, highly plastic clay, all of the particles of said clay being homogeneously distributed throughout the particles of said cement, and said mortar being free from waterproofing organic compounds in sufficient amounts to impart waterproofing properties thereto, substantially as described.

6. A waterproof Portland cement mortar, comprising sand, hydrolized ordinary Portland cement, colloidal clay, all of the particles of said clay being homogeneously distributed throughout the particles of said cement, and an amount of a compound of a sesqui-oxid-forming metal in excess of the amount normally present in said cement, said mortar being free from waterproofing organic compounds in sufficient amounts to impart waterproofing properties thereto and being free from abnormal quantities of acids or alkalies, substantially as described.

7. In the process of making Portland cement mortar, the step which consists in intimately mixing in a dry condition, "neat" ordinary Portland cement and an inorganic colloid, capable of freely flowing through dies sufficiently small to prevent the passage of finely divided common clay containing but small amounts of colloidal matters and corresponding in its colloid content to colloidal sedimentary clay said mixing accomplishing a homogeneous and intimate combination of the particles of said cement and the particles of said colloid, substantially as described.

8. In the process of making Portland cement mortar, the step which consists in intimately mixing in a dry condition, "neat" ordinary Portland cement and sedimentary colloidal clay, said clay being substantially free from sand and capable of freely flowing through dies sufficiently small to prevent the passage of finely divided common clay containing but small amounts of colloidal matters, whereby a homogeneous and intimate combination of the articles of said cement and the particles of said clay is obtained, substantially as described.

9. The intermediate product obtained in the process of making waterproof Portland cement mortar, which consists of an intimate, finely pulverized mixture of ordinary Portland cement and an unburnt inorganic colloid capable of freely flowing, when isolated, through dies sufficiently small to prevent the passage of finely divided common clay containing but small amounts of colloidal matters and corresponding in its colloid content to colloidal sedimentary clay, all of the particles of said inorganic colloid being homogeneously distributed throughout the particles of said cement, said mixture consisting chiefly of Portland cement, and being free from waterproofing organic compounds in sufficient amounts to impart waterproofing properties to cement mortar produced therefrom, substantially as described.

10. The intermediate product obtained in the process of making waterproof Portland cement mortar, which consists of an intimate, finely pulverized mixture of ordinary Portland cement and unburnt sedimentary, colloidal clay capable of freely flowing through dies sufficiently small to prevent the passage of finely divided common clay containing but small amounts of colloidal matters, all of the particles of said clay being homogeneously distributed throughout the particles of said cement, said mixture consisting chiefly of Portland cement, and being free from waterproofing organic compounds in sufficient amounts to impart waterproofing properties to cement mortar produced therefrom, substantially as described.

11. In the process of making Portland cement mortar, the step which consists in mixing a cement containing chiefly ordinary Portland cement free from abnormal quantities of free alkalies, with sand in the presence of a dilute solution of a soluble salt of a sesqui-oxid-forming metal and in the absence of hygroscopic salts and sufficient quantities of waterproofing organic compounds to impart waterproofing properties to the resulting cement mortar, substantially as described.

12. In the process of making Portland cement mortar, the step which consists in mixing a cement containing chiefly ordinary Portland cement free from abnormal quantities of free alkalies, with a relatively large quantity of an inert silicious body material, in the presence of a dilute solution of a soluble salt of a sesqui-oxid-forming metal and in the absence of hygroscopic salts and sufficient quantities of waterproofing organic compounds to impart waterproofing properties to the resulting cement mortar, substantially as described.

13. The process of making waterproof Portland cement mortar, which consists in first intimately mixing in a dry condition, ordinary Portland cement and an unburnt inorganic colloid, then mixing the same with a relatively large quantity of an inert silicious body material, in the presence of a dilute solution of a soluble salt of a sesqui-oxid-forming metal, and then permitting the mass to set, substantially as described.

14. In the process of making Portland cement mortar, the step which consists in mixing a cement containing chiefly ordinary Portland cement, free from abnormal quantities of free alkalies, with a relatively large quantity of sand, in the presence of a 1% solution of aluminium sulfate, and then permitting the mass to set, substantially as described.

15. The process of making waterproof Portland cement mortar, which consists in first intimately mixing in a dry condition ordinary Portland cement and an unburnt inorganic colloid, then mixing the same with sand in the presence of a dilute solution of a soluble colloiding agent, capable of forming an insoluble precipitate with the calcium oxid normally present in the cement, and having weak acid properties, and then permitting the mass to set, substantially as described.

16. The process of making waterproof Portland cement mortar, which consists in first intimately mixing in a dry condition ordinary Portland cement and unburnt sedimentary colloidal clay, then mixing the same with an inert silicious body material, in the presence of a dilute solution of a soluble colloiding agent, capable of forming an insoluble precipitate with the calcium oxid normally present in the cement, and having weak acid properties, and in the absence of hygroscopic salts and sufficient quantities of waterproofing organic compounds of a bituminous, resinous, oily, fatty or albuminous nature to impart waterproofing properties to the resulting cement mortar, substantially as described.

17. In the process of making Portland cement mortar, the step which consists in mixing a cement containing chiefly ordinary Portland cement, free from abnormal quantities of free alkalies, with relatively large quantities of an inert, silicious body material, in the presence of a dilute solution of a soluble colloiding agent, capable of forming an insoluble precipitate with the calcium oxid normally present in the cement, and having weak acid properties, and in the absence of hygroscopic salts and sufficient quantities of waterproofing organic compounds of a bituminous, resinous, oily, fatty or albuminous nature to impart waterproofing properties to the resulting cement mortar, substantially as described.

18. In the process of making Portland cement mortar, the step which consists in mixing a cement containing chiefly ordinary Portland cement free from abnormal quantities of free alkalies, with relatively large quantities of an inert, silicious body material, in the presence of a colloiding agent comprising a dilute solution of a soluble salt of a polyvalent metal, capable of forming an insoluble precipitate with the calcium oxid normally present in the cement, and having weak acid properties, and in the absence of hygroscopic salts and sufficient quantities of waterproofing organic compounds of a bituminous, resinous, oily, fatty or albuminous nature to impart waterproofing qualities to the resulting cement mortar, substantially as described.

In testimony whereof, I have signed my name to this specification in the presence of two subscribing witnesses, this twenty-second day of October 1907.

RICHARD H. GAINES.

Witnesses:
CHARLES E. WERZ,
W. H. SWENARTON.